Dec. 18, 1923.

C. E. LONN 1,477,572

RIM FOR WHEELS

Filed Nov. 27, 1922

Inventor,
Charles E. Lonn,
By Frank S. Ackerman
Attorney

Patented Dec. 18, 1923.

1,477,572

UNITED STATES PATENT OFFICE.

CHARLES E. LONN, OF VIOLA, ILLINOIS.

RIM FOR WHEELS.

Application filed November 27, 1922. Serial No. 603,580.

*To all whom it may concern:*

Be it known that I, CHARLES E. LONN, a citizen of the United States of America, and resident of Viola, in the county of Mercer and State of Illinois, have invented certain new and useful Improvements in Rims for Wheels, of which the following is a specification.

This invention relates to rims for pneumatic tires, and particularly to a rim having a section which is detachably secured to another section whereby a tire is held on the rim, the said removable section being intended to free the tire in order that it may be removed laterally of the rim for the purpose of repair or renewal; and the said invention has for an object the provision of novel means whereby the removable section may be expeditiously secured in place or released.

A further object of this invention is to produce a sectional rim in which the joints between the sections are interlocked and held in their interlocked engagement by an element that may be expeditiously manipulated to secure or release it.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1:
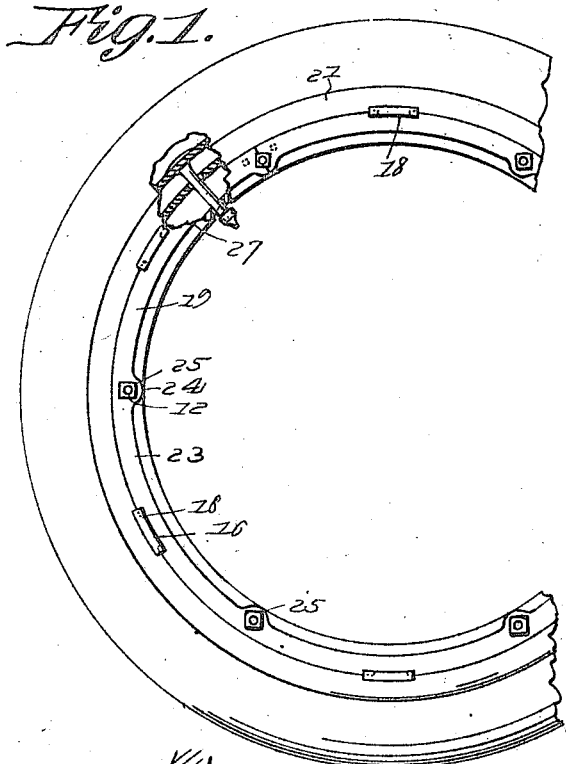
Figure 1 illustrates a view in elevation of a fragment of a rim and tire partly in section.

In these drawings, 10 denotes an ordinary felly having apertures 11 therethrough for the reception of the bolts 12 by which the rim is held in place, as will presently appear.

The section 13 of the rim has a tire flange 14 and lugs 15 which lugs bear against one edge of the felly to hold the section 13 against movement transversely of the felly, and the said section has a plurality of tongues 16 that project beyond the edge of the felly opposite the edge engaged by the lugs 15. The tongues are formed integral with the section 13 of the rim and a shoulder 17 is produced at the junction of the said section and each of the tongues. Each tongue also has a depending flange 18 at its outer end for a purpose to be presently explained. The felly has recesses $17^a$ constituting clearances to allow the lugs 15 to pass said felly when being applied or removed.

Figure 2:
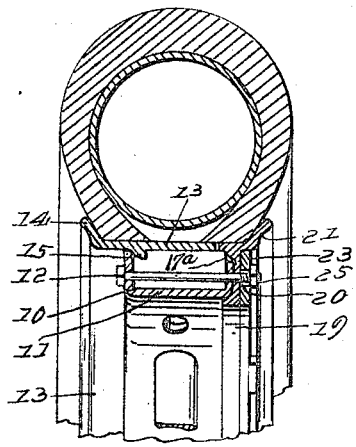
Figure 2 illustrates a transverse sectional view thereof through one of the bolts.
Figure 3:
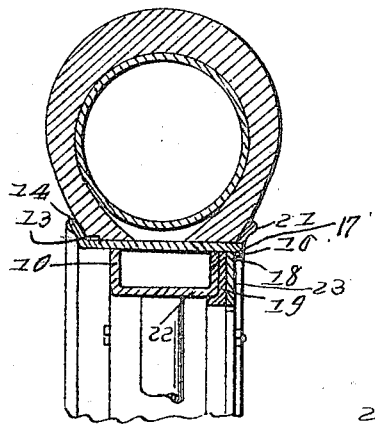
Figure 3 illustrates a transverse sectional view offset with relation to the section of Fig. 2.

The coacting section of the rim comprises a ring 19 having apertures 20 to receive the bolts 12, and the said ring has a tire flange 21 extending outwardly, similar to the flange 14, and when the coacting section is applied to the felly, the parts will assume the relations shown in Fig. 2 of the drawing. The ring 19 has a plurality of slots 22 which coincide with the tongues and are adapted to receive the tongues when the coacting section is in place.

A split ring 23 has apertured ears 24, the apertures of which are intended to receive the bolts 12, and this ring is applied against the side of the ring and its edge is seated back of the flanges of the tongues, so that when the nuts 25 are run on the bolts, the split ring will serve to engage the shoulders of the flanges 18 and further aid in retaining the ring 19 in place. By the arrangement just described, the split ring will be prevented from disengaging the flanges of the tongues so long as the bolts retain the split ring in its assembled relation to the said tongues, and it will be observed that this interengagement of the parts will result in a strong and durable arrangement for holding the tire on the rim.

The section 13 of the rim has a boss 26 on its inner surface which lies in a recess 27 formed in the felly, and by this means, circumferential movement of the rim with relation to the felly will be prevented.

Figure 6:
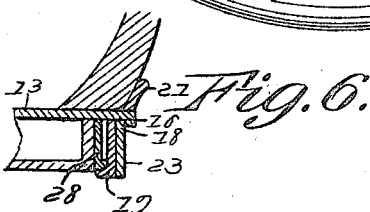
Figure 6 illustrates a sectional view of a fragment of the rim and tire embodying a modification.
Figures 4, 5:
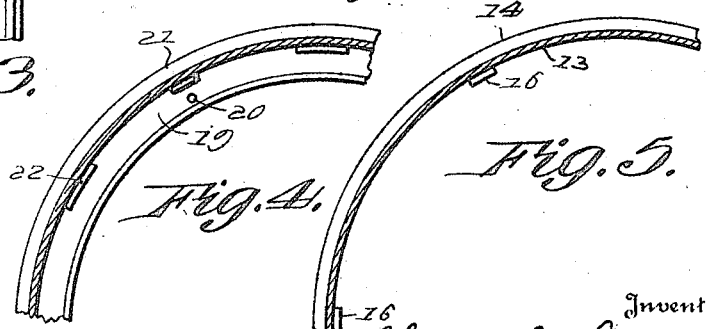
Figure 4 illustrates a sectional view of a fragment of the removable section of the rim.
Figure 5 illustrates a sectional view of the stationary section thereof.

In the modification shown in Fig. 6, the parts are the same as those heretofore described, with the single exception that a plate 28 may be applied to one edge of the felly or any appropriate filling may be used in order that the width of the felly and filling will be such as to accommodate and coact with the parts of the device constituting the invention.

I claim:

1. In a sectional rim for wheels, a section having a tire flange, lugs on said section adapted to engage the edge of a felly, tongues formed integral with the opposite edge of the said section, said tongues having flanges, a coacting rim section having a tire flange interengaging the first mentioned section and having openings to receive the tongues, a split ring applied to the second mentioned section and engaging the flanges of the tongues, and means for holding the split ring in place.

2. In a sectional rim for wheels, a section having a tire flange, lugs on said section adapted to engage the edge of a felly, tongues formed integral with the opposite edge of the said section, said tongues having flanges, a coacting rim section having a tire flange interengaging the first mentioned section and having openings to receive the tongues, a filler plate adapted to be applied to a side of the felly, a split ring applied to the second mentioned section and engaging the flanges of the tongues, the said split ring exerting pressure on the filling ring, and means for holding the split ring in engagement with the inner surfaces of the flanges of the tongues.

CHARLES E. LONN.